United States Patent [19]
Amano

[11] 3,873,201
[45] Mar. 25, 1975

[54] METHOD OF DETERMINING EXPOSURE AMOUNTS IN PHOTOGRAPHIC PRINTING

[75] Inventor: Tadashi Amano, Tokyo, Japan

[73] Assignee: Konishiroku Photo Industry Co., Ltd., Tokyo, Japan

[22] Filed: Aug. 17, 1973

[21] Appl. No.: 389,207

[30] Foreign Application Priority Data
Aug. 25, 1972 Japan................................ 47-85119

[52] U.S. Cl................. 355/77, 355/38, 355/88
[51] Int. Cl. ............................................. G03b 27/78
[58] Field of Search .................... 355/35, 38, 88, 77

[56] References Cited
UNITED STATES PATENTS
3,663,110  5/1972  Rising ................................. 355/38
3,694,074  9/1972  Huboi et al. ........................ 355/38
3,724,947  4/1973  Paulus................................. 355/88

*Primary Examiner*—Richard A. Wintercorn
*Attorney, Agent, or Firm*—Stevens, Davis, Miller & Mosher

[57] ABSTRACT

This invention relates to a method of determining exposure amounts in photographic printing.

In the method of the present invention, optimum exposure amounts in printing for a first negative frame on a strip is determined, optimum exposure amounts in printing for a second negative frame on the strip which is deemed to be equivalent to said first negative frame with respect to the characteristics are determined, and actual exposure amounts are finally determined based on the combination provisionally determined exposure amounts of said first and those of said second frame or frames.

5 Claims, 2 Drawing Figures

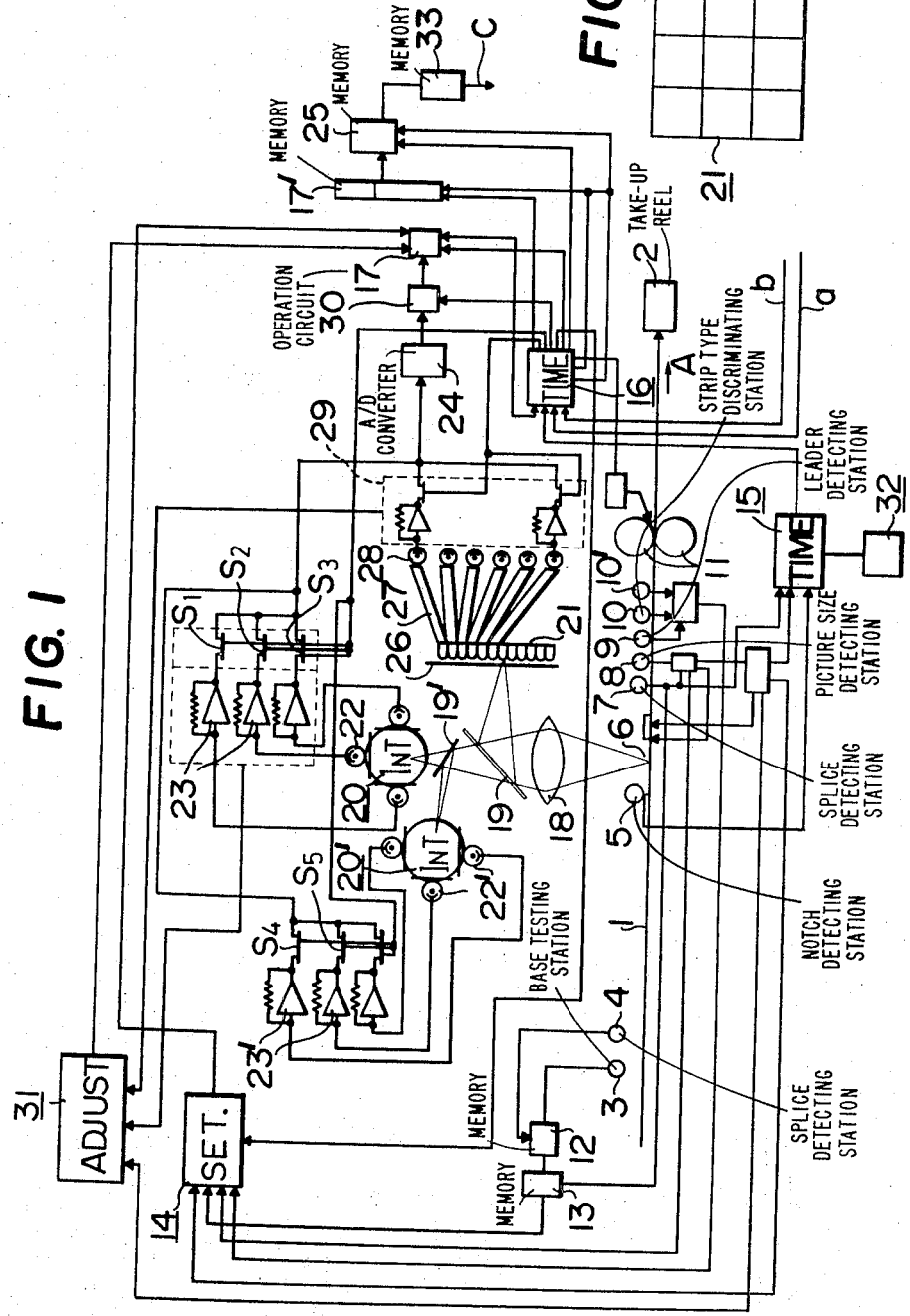

METHOD OF DETERMINING EXPOSURE AMOUNTS IN PHOTOGRAPHIC PRINTING

This invention relates to a method of determining exposure amounts in photographic printing.

Particularly this invention relates to a method using a strip which has a plurality of negatives. In a photographic printing system, a method is adopted for controlling to a predetermined level the quantity of light of different colors of blue, green and red to which the negative is exposed for effecting printing. This is because it has empirically been ascertained that almost all the scenes are found to have a hue and a lightness which are constant in value when the hue and lightness of the majority of the area of each scene are integrated. Thus, when the picture of the subject represents a departure from the standardized scene, a positive very poor in quality would be obtained if the quantity of light to which the negative is exposed for obtaining a print is controlled according to the results obtained empirically as aforementioned.

For example, let us assume that a printer is set such that a positive of high quality is obtained for the standardized scene. If a negative of a portrait of a figure sitting or standing on a red carpet were analyzed by such printer, the positive produced would be grayish in color as a whole or lacking in red color. A negative of a scene in which only one or two colors are predominant is referred to as a subjective color failure. It has hitherto been customary to manually effect color correction in such negative.

Also, when a negative of a scene is unbalanced in luminance, such for example as the one of a portrait of a figure in the snow background, a positive inferior in quality would be obtained if it were printed under conditions for obtaining a positive of a good quality from a negative of the standardized scene. A negative of a scene of this type is referred to as a subjective density failure. It has hitherto been necessary to effect manually color correction in such negative too.

When a printing system is employed in which the quantity of light transmitted through the majority of the area of a negative to be printed or a large area transmittance density is controlled to a predetermined level, that is, the exposure amount is controlled based on the large area transmittance density, it will be possible to obtain a positive of high quality by effecting correction in case the large area transmittance density is varied by the influences of light used in taking the photograph. However, it is impossible to mechanically detect a variation in the density of color resulting from subjective density failure or subjective color failure. When this occurs, it has been customary to attribute such variation in color density to a change in the large area transmittance density of the negative resulting from causes most often experienced, e.g. over-exposure or under-exposure or a change in the type of light used in taking the photograph. It has accordingly been customary to automatically take measures to cope with under-exposure or a change in the type of light used in taking the photograph and to manually effect correction when the change in color density is due to these failures.

Proposals have been made in recent years to automate photographic printers, so that it has become possible to automatically effect correction of color failures to a certain degree. On the other hand, such automation does not provide for effecting fully correction of a change in the quality of light used in taking the photograph. Also, in order to automatically detect density failure, proposals have been made to employ a printing method in which the area of a negative is divided into a plurality of sub-areas, the density distribution in each area is determined, and the density of the sub-area or sub-areas in which it is considered from the statistics that the subject is most likely to be positioned is used as a subject density, so that color correction can be effected for such subject density. However, the results produced by such method are unsatisfactory, and all the types of automatic photographic printers now in practical use require manual attention in effecting correction.

There are two reasons why a photographic printing system for automatically effecting color correction for subjective color failure and subjective density failure is not put to practical use. They are as follows:

1. it is not possible to differentiate between a negative in which a variation in color or colors has occurred due to a subjective color failure and a negative in which a variation in color or colors is caused by a change in the type of light used in taking the photograph; and 2. when a negative is found to have a density failure, correction is effected based on data comprising the density information of the whole area of the negative and the density of a sub-area or sub-areas of the negative in which it is considered from the statistics that the subject is mostly likely to be positioned, but a positive very inferior in quality is often produced due to the difficulty experienced in ascertaining the background scenery of the subject or the pattern of the picture and the type of the light used in taking the photograph.

The present invention has as its object the provision of a photographic printing method which obviates the aforementioned two disadvantages of the prior art.

Particularly when a negative has a color failure, difficulty is faced in determining whether the resulting color of the negative to be printed is due to a fluorescent light for example or the scene of the picture which is rich in green color for example. The decision is, therefore, made statistically. More specifically, it was found that when negatives are studied, if one negative frame is that photographed using a fluoroescent light, a succeeding negative frame or frames are those photographed using the same light with the probability of 95%. Accordingly, negative frames more than two are finally decided to be photographed using a fluoroescent light in the case that consecutive frames are found to by photographed using the same light.

This invention is based on this statistical analysis. According to the invention, frames of a negative film are divided by a known method into four groups, group 1 consisting of negatives having a color variation due to the type of light used in taking the photograph, group 2 consisting of negatives having a color variation due to a color failure, group 3 consisting of negatives in which it is impossible to determine whether the color variation is due to the type of light (fluorescent light or incandescent light) used in taking the photograph or to a color failure, and group 4 consisting of negatives of a standardized scene. The information on each frame of the negative film as to which group they belong to is temporarily stored. When any frame is found to belong to group 3, the information on the two frames immediately preceding and the other immediately succeeding such frame to be analyzed on the same negative film is compared with the stored information of the frame. When it is revealed that the information differs from each other or the preceding and succeeding frames belong to a group or groups other than group 3, it is decided to effect correction in the frame to be analyzed according to the degree of correction prescribed for either one of the preceding and succeeding frames when printing is carried out. In case it is revealed that there is no difference between the information or that the frames preceding and succeeding the frame being analyzed on the same negative film belong to group 3, the color variation in the frame being analyzed is judged to be due to a change in the type of light used in taking the photograph and correction thereof is effected accordingly.

Statistics show that the probability of photographing the same scene in more than two frames consecutively is 67%. In the above case, a comparison of the large area transmittance densities of the frames shows that a difference in density is less than 0.10. If the individual analysis and determination of exposure amount are adopted to such consecutive negative frames, exposure amounts for each frame are different from each other. Accordingly, the consecutive two frames of the same scene are printed after effecting correction in one of them while effecting no correction in the other frame, so that the two prints produced may impress the viewer differently. It is important that the two prints are of the same quality.

A negative is analyzed to determine whether it has a subjective density failure based on the information on its large area transmittance density and the density of a sub-area or sub-areas of the negative in which it is considered from the statistics that the subject is most likely to be present. When this process is used to analyze one frame of a negative film after another and print such frames, the positives obtained may be greatly influenced by differences between the frames in the density of the portions of the frames in which the subject is actually positioned and the density of the portion of the frames in which the subject is thought to be most likely to be present by probability. This will lead to over-correction on one hand and under-correction on the other.

According to the present invention, the large area transmittance density of a frame to be printed and the prescribed printing correction value therefor are temporarily stored, and the large area transmittance density of such frame is compared with the large area transmittance density of one or more frames preceding and succeeding such frame, in order to eliminate the aforementioned correction errors. In case the difference is less than 0.10 as the result of the comparison, an average of the prescribed printing correction value for the preceding and succeeding frames and the prescribed printing correction value for the frame analyzed is given to the frame analyzed as a final printing correction value. By comparing a frame with preceding and succeeding frames in the same negative film so as to effect adjustments in the printing correction value, it is possible to produce, from consecutive frames of a negative film, positives which are well balanced in printing quality and devoid of any error in determining the degree of adjustments to be made in any frame in the negative film.

Additional and other objects and features of the invention will be evident from the description when considered in conjunction with the accompanying drawing, in which:

FIG. 1 shows an apparatus adapted to carry the steps of the method according to the invention; and FIG. 2 is a plan view of the density testing detectors.

The method according to the invention will now be described in detail with reference to the drawing.

1 is a photographic image carrying strip which consists of a number of negative films spliced to one another, with a notch being formed at each frame in suitable position. The strip 1 is passed through a base testing station 3, splice detecting station 4, notch detecting station 5, negative transmittance density measuring station 6, splice detecting station 7, picture size detecting station 8, a leader detecting station 9, strip type discriminating station 10 and negative carrier drive 11 during its movement in the direction of an arrow A to a negative intermittent take-up reel 2. The order in which these sections are arranged may be varied from the indicated one.

The mask density of each strip is analyzed at the base testing station 3. When a spliced portion of the strip reaches the splice detecting station 4 disposed in the vicinity of the base testing station 3, a memory 12 is cleared by a reset pulse from the splice detecting station 4 and a signal from the base testing station 3 is stored in the memory 12. The stored signal is transferred to another memory 13 by a signal from the splice detecting station 7 disposed posterior to the negative transmittance density measuring station 6, and then transferred to a condition setting station 14.

At the notch detecting station 5, the notch formed in each frame on the strip is detected and the strip 1 is guided to the negative transmittance density measuring station 6 frame by frame by the output of the notch detecting station 5 which operates in cooperation with timing circuits 15 and 16.

At the negative transmittance density measuring station 6, the density distribution and the quantity of light transmitted through three color components of the strip of negative films are tested.

At the picture size detecting station 8, the size of the frames on the strip of negative films is detected and determined whether it is of a full-size or half-size.

At the strip type discriminating station 10, different types of negative films are differentiated from one another. An output of the station 10 is reset by an output of the leader detecting station 9 produced upon detection of a leader portion of a negative film, so as to differentiate strips from one another according to the manufacturers (the photographic characteristics of strips differ from one manufacturer to another) and supply a signal to the condition setting station 14.

The negative carrier drive 11 is adapted to intermittently feed the strip 1 through timing circuit 16 which is adapted to associate with the notch detection signals from the notch detecting station 5.

Thus, mask density signals on strips from the base testing station 3, picture size signals from the picture size detecting station 8 and signals on the types of strips depending on the manufacturers from the strip type discriminating station 10 are supplied to the condition setting station 14 which is set at a predetermined set of conditions in digital form beforehand. Accordingly, conditions suiting various signals are selected and supplied as an input to an operation circuit 17.

At the negative transmittance density measuring station 6, the density and the transmittance density of the three color components of each frame of the strip 1 delivered to the station 6 are measured by illuminating the strip by light emanating from a light source (not shown). The light transmitted through the strip is passed through a lens 18 and a half-mirror 19, and one part of it is introduced to a three color components transmittance density testing integrating sphere 20 while the other part is introduced to a density tester 21. When a notch is detected at the notch detecting station 5, a predetermined frame on the strip is stopped at the negative transmittance density measuring station 6, so that the notch detecting signal for the particular frame is supplied through the timing circuits 15, 16 to the operation circuit 17 as an input.

The three color components transmittance density measuring integrating sphere 20 includes three photomultiplier tubes 22 provided with red R, green G and blue B filters respectively for mesuring the quantities of transmitted light of the red, green and blue components. Outputs of the three photomultiplier tubes 22 proportional to the respective quantities of transmitted light are supplied through amplifiers 23 to an analogue-to-digital converter 24 as an input where they are converted into digital signals and supplied to the operation circuit 17 for calculation. When the blue density, green density and red density are determined, suitable correction values for these densities are selected from sets of correction values which have been converted into digital form and added at the operation circuit 17 to signals from the condition setting station 14, and resultant signals are supplied to a temporary memory 25.

A half-mirror 19' may be mounted in the path of movement of the transmitted light to the three color components transmittance density testing integrating sphere 20, so that light reflected by the half-mirror 19' is led to an integrating sphere 20' to determine the three color components transmittance densities in the central portions of the frame only. This arrangement is effective in effecting color correction as subsequently to be described.

Part of the light reflected by the half-mirror 19 is led to a plurality of density measuring members 21. An output of each member 21 is led through one of the photoconductive tubes 27 (fiber-optic bundles, for example) to one of the photomultiplier tubes 28. The density measuring members 21 are assembled as shown in FIG. 2 for measuring the densities of the central portion, upper portion, lower portion, left portion, right portion and the like of a frame. In measuring density, the density of only one color may be detected as subsequently to be described. However, the density of three colors may be detected.

The output of each photomultiplier 28 is supplied to the analogue-to-digital converter 24 through an amplifier 29, and calculated at the operation circuit 17. A correction value selected from among a set of correction values stored beforehand in a correction value memory 17' is added to the result of the calculation. Then, the information is stored in the temporary memory 25.

At the temporary memory 25, the quantity of light transmitted through the majority of the area, the types of light used in taking the photograph and the correction values of the particular frame to be analyzed and the frames preceding and succeeding such frame are stored, so as to judge whether the light used in photographing the consecutive frames is of the same type or not and determine whether the frame analyzed is similar to the frames compared with it in the quantity of light transmitted through the majority of the area thereof. Thus, amended correction values are obtained and final correction values are successively stored in a memory 33.

When the frame to be printed is disposed at an exposing station, a correction value C is produced by instructions from the timing circuit 16, so that the printing is effected in accord with its final correction value. In this embodiment, all the frames are analyzed and the information is stored in the memory 33 consecutively from the first to the last frames and read out in the same order by instructions from the exposing means so as to effect synchronizing of the correction value with the frame to be printed. In order to ensure that synchronizing is effected satisfactorily, splice tapes and marks for each set of ten films are utilized.

In the embodiment shown and described herein, there is provided only one analogue-to-digital converter 24. This makes it necessary to provide changeover switches $S_1, S_2, \ldots S_n$ so as to successively supply outputs of the amplifiers 23 and 29 to the analogue-to-digital converter 24. The timing circuit 16 cooperates in performing the sequence. The results of measurements are supplied to a shift register 30 and then to the operation circuit 17. Alternatively, each amplifier 23, 29 may be provided with an analogue-to-digital converter. This eliminates the shift register 30, so that the outputs of the converters can be directly supplied to the operation circuit 17.

It is for the purpose of measuring not only the average transmittance density of the whole area of a frame but also the maximum density, minimum density, center position density, peripheral position density, upper position density, lower position density, rightward position density and leftward position density thereof that there are provided a plurality of density measuring members 21. Correction values for various density failures are calculated from a combination of density values obtained by the aforementioned density measuring operation.

31 is an adjusting station for adjusting the sensitivities of detectors 23, 23' and 28. 32 is an indicating station where indicating tubes are provided for indicating the number of tested frames and the correction values.

From the foregoing description, it will be appreciated that the invention provides a method of analyzing negatives for obtaining good positives or prints therefrom in which the result of testing of a frame to be printed is corrected by comparing the frame with immediately preceding and succeeding frames. The invention is effective in producing positives which are uniform in quality without over-correction or under-correction which often happens in automatic negative analyzing systems. The method according to the invention eliminates an error which would inevitably be made in judging the type of light used in photograph when one frame only is analyzed, and non-uniformity of quality of printed positives which would result fro inability to ascertain the pattern of the picture is avoided.

What is claimed is:

1. A method of determining exposure amounts in photographic printing for a strip carrying a plurality of pictures comprising the steps of measuring characteristics of a first negative frame on said strip; provisionally determining optimum exposure amounts in printing for said first negative frame based on the result obtained in said measuring step; storing said optimum exposure amounts; measuring characteristics of at least one of several negative frames on said strip other than said first negative frame; selecting a second negative frame which is deemed to be equivalent to said first negative frame with respect to the characteristics from said several negative frames, said second negative frame and said first negative frame consecutively following one another on said strip; provisionally determining exposure amounts based on the result obtained in measuring said second frame; and finally determining exposure amounts for said first frame based on the combination provisionally determined exposure amounts of said first and those of said second frame.

2. A method of determining exposure amounts in photographic printing according to claim 1, comprising detecting the type of light used in taking photograph by comparing the results of measurements of said first frame and that of said second frame.

3. A method according to claim 1 wherein the selection of said second negative frame which is deemed to be equivalent to said first negative frame is effected such that selection is made from among a plurality of negative frames immediately preceding or succeeding said first negative frame.

4. A method according to claim 1 wherein the step of finally determining comprises comparing the negative frame to be printed with other negative frames with respect to the large area transmittance density of the negative frames including comparing them with respect to the densities of transmittance of blue, green and red colors.

5. A method according to claim 1 wherein the final determination of exposure amounts for the negative frame to be printed includes comparing optimum exposure amounts for the selected negative frame with said stored exposure amounts and then selecting an average of all the exposure amounts as a final optimum exposure amount when the difference between them is less than 0.10.

* * * * *